United States Patent [19]

Hartstein

[11] Patent Number: 4,969,356
[45] Date of Patent: Nov. 13, 1990

[54] APPARATUS FOR MEASURING THE VOLUME OF AN OBJECT

[76] Inventor: Stanley Hartstein, 1948 E. 9th St., Brooklyn, N.Y. 11223

[21] Appl. No.: 396,438

[22] Filed: Aug. 21, 1989

Related U.S. Application Data

[63] Continuation-in-part of Ser. No. 301,949, Jan. 26, 1989, abandoned.

[51] Int. Cl.$^5$ ............................................. G01F 17/00
[52] U.S. Cl. ......................................... 73/149; 73/426; 73/37.5
[58] Field of Search .......................... 73/426, 149, 37.5

[56] References Cited

U.S. PATENT DOCUMENTS

| | | | |
|---|---|---|---|
| 2,747,400 | 5/1956 | Fatio | 73/149 |
| 3,113,448 | 12/1963 | Hardway, Jr. et al. | 73/149 |
| 3,624,828 | 11/1971 | Edwards | 73/149 |
| 4,083,228 | 4/1978 | Turner et al. | 73/149 |
| 4,112,738 | 9/1978 | Turner | 73/149 |
| 4,184,371 | 1/1980 | Brachet | 73/149 |
| 4,196,618 | 4/1980 | Patterson | 73/149 |
| 4,369,652 | 1/1983 | Gundlach | 73/149 |
| 4,430,891 | 2/1984 | Holm | 73/149 |
| 4,550,592 | 11/1985 | Dechape | 73/37.5 |
| 4,713,966 | 12/1987 | Thyren et al. | 73/149 |
| 4,770,033 | 9/1988 | Nicolai | 73/149 |
| 4,811,601 | 3/1989 | Tolan | 73/149 |

FOREIGN PATENT DOCUMENTS 3510574 10/1985 Fed. Rep. of Germany ........ 73/149
2602588 2/1988 France ........................... 73/149

Primary Examiner—William A. Cuchlinski, Jr.
Assistant Examiner—Diego F. F. Gutierrez
Attorney, Agent, or Firm—Ostrolenk, Faber, Gerb & Soffen

[57] ABSTRACT

A device for measuring the volume of objects by use of air pressure includes a container which has a primary rod and a secondary rod, desired portions of which can be controllably disposed in the interior of the container. These rods are graduated so that it is possible to note the degree of penetration of the primary rod into the container and, similarly, the volume of the portion of the second rod in the container. The container is designed to be closed airtight and to hold the object of unknown volume. The primary rod is forced into the container to generate an elevated pressure which pressure is noted. Thereafter, the object is removed and in its place a sufficient portion of a second rod, estimated to equal the volume of the object being measured, is disposed in the container. The primary rod is then repositioned as before with the idea of obtaining the same pressure reading as before. If the same pressure reading is not obtained, the amount of penetration of the secondary rod into the container is readjusted and the primary rod is again inserted to the same degree to obtain the originally noted pressure reading. These steps are repeated until a close enough pressure reading is obtained at which point the volume of the object being measured is determined by noting the degree of penetration of the secondary rod.

20 Claims, 2 Drawing Sheets

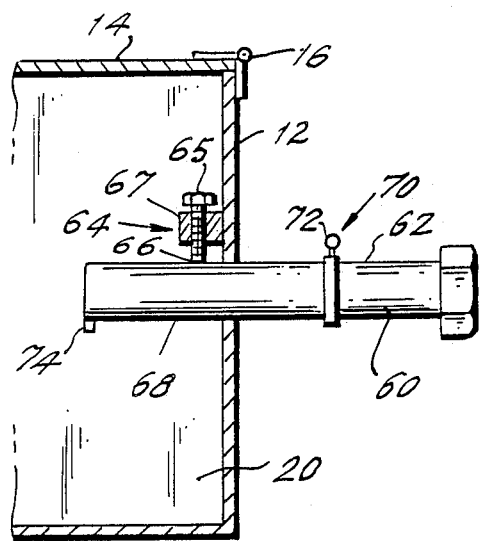
FIG. 4.
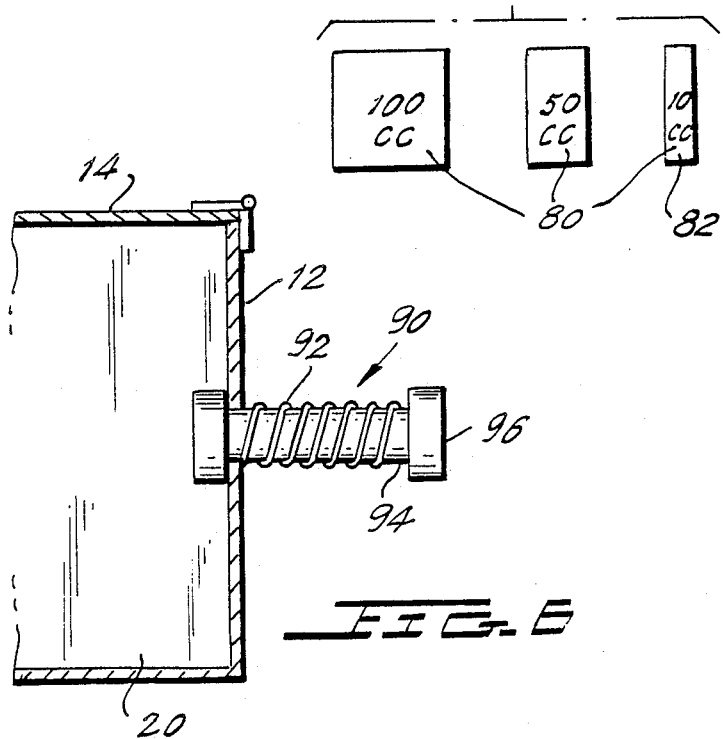
FIG. 5.
FIG. 6.

APPARATUS FOR MEASURING THE VOLUME OF AN OBJECT

This is a continuation-in-part of United States patent application Ser. No 07/301,949 which was filed on Jan. 26, 1989.

BACKGROUND OF THE INVENTION

The present invention relates to a measurement device for measuring the volume of an object and more particularly to a device of this type which operates by use of air pressure and which is simple to construct and use.

In the past, a common method for measuring the volume of an object involved using a container, e.g. a graduated cylinder, into which water or any other liquid was introduced. The liquid level was recorded before and after the object of unknown volume was disposed in the graduated container. The change in the water level indicated the volume of the object.

To obtain more accurate measurements, more refined models of the above apparatus have been developed.

SUMMARY OF THE INVENTION

Generally, the primary object of the present invention is to provide a volume measuring device which is exceedingly simple to construct and use.

It is also an object of the invention to provide a method and an apparatus for measuring the volume of an object in a manner which produces a reliable volume measurement.

The foregoing and other objects of the invention are realized by means of a method and apparatus which rely on the principle of altering the pressure within an enclosed, airtight container in which the object of the unknown volume has been placed. Thereafter, the object of unknown volume is removed and an adjustable amount of a graduated rod is introduced into the container to produce the same altered pressure. In this manner, the unknown volume of the object being measured can be read by noting how much of the graduated rod had to be introduced into the container to produce the same effect.

Other features and advantages of the present invention will become apparent from the following description of the invention which refers to the accompanying drawings.

BRIEF DESCRIPTION OF THE DRAWINGS

FIG. 4 shows a modified rod construction which facilitates the introducing and withdrawing of rods into and out of the container of FIG. 1.

FIG. 5 schematically depicts a plurality of objects of known volumes which are usable in conjunction with the method of the present invention.

FIG. 6 schematically depicts a still further modified rod embodiment of the present invention.

DETAILED DESCRIPTION

Figure 1:
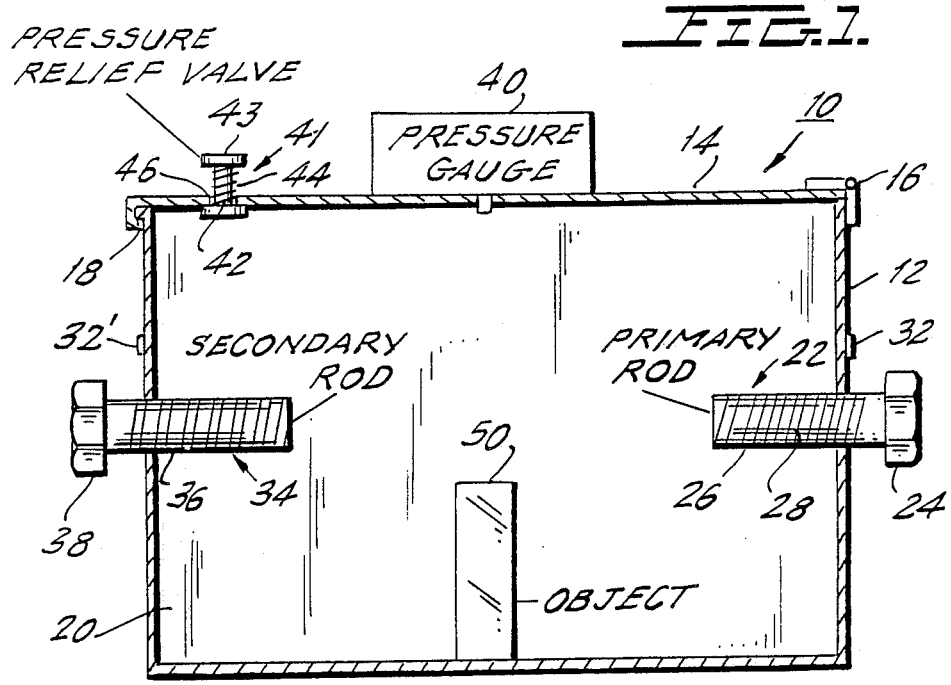
FIG. 1 is a schematic block diagram of an apparatus in accordance with a preferred embodiment of the present invention.

Referring to FIG. 1, a volume measuring device 10 in accordance with the present invention includes a container 12 which can be closed airtight and which has a cover 14. The cover 14 is hinged at 16 and can be latched closed by means of a latch mechanism 18. The container 12 encloses and defines an interior 20.

Figure 2:
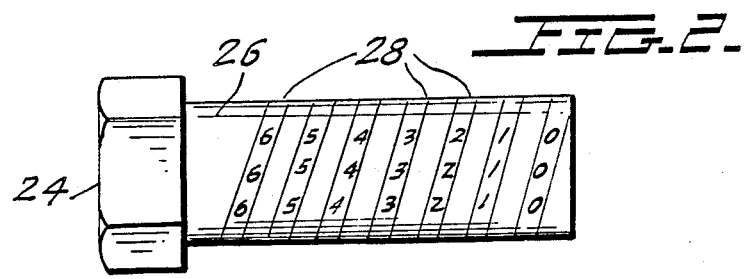
FIG. 2 is an enlargement of certain rods which are associated with the embodiment of FIG. 1.
Figure 3:
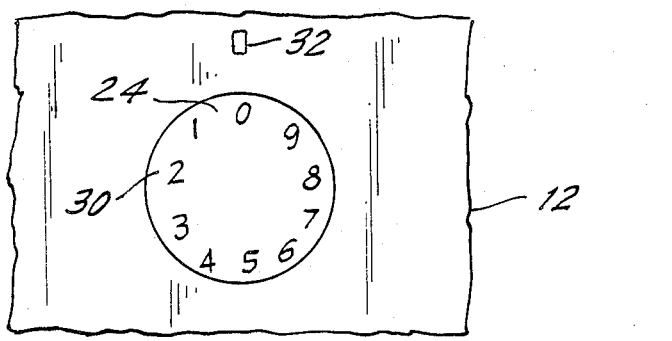
FIG. 3 is a view taken along the arrows 3-3 in FIG. 2.

A primary rod 22 has a threaded shaft 26 and a turning knob 24. The knob 24 allows an operator to screw desired amounts of the shaft 26 of the primary rod 22 into the interior 20 of the airtight container 12. The primary rod 22 is further provided with numerical graduations 28 on its shaft 26 (FIG. 2) and with additional graduations 30 on the knob 24 thereof (FIG. 3). The graduations 28 and 30, with the aid of the marker 32 on the container 12, make it possible to determine the exact degree of penetration of the primary rod 22 into the interior 20 of the container 12.

A secondary rod 34 is also provided which is essentially identical to the rod 22 and which includes its own threaded shaft 36, knob 38, and set of graduations. At the secondary rod 34, however, the function of the graduations is to provide a direct indication of volume, e.g. in centimeters cubed or the like, which the shaft 36 of the rod 34 occupies in the interior 20. However, any graduation numbering system will do which could be converted into units of volume.

While a single primary rod 22 and a single secondary rod 34 are illustrated, each of the illustrated rods is representative of a plurality of rods which might be provided, if desired.

A pressure gauge 40 is attached at the cover 14 of the container 12 to provide a reading of the pressure within the interior 20.

The present invention requires, at times, restoration of atmospheric pressure conditions within the interior 20 and it is desirable to be able to accomplish the same without having to open the cover 14. Accordingly, a pressure relief valve 41 is operable, by applying a force to the tab 43 thereof against the spring 44, to provide, in this manner, an air path for atmospheric air through an opening 46.

The method for measuring the unknown volume of an object 50 proceeds as follows. First, the rods 22 and 34 are positioned at their origins, i.e. such that practically the entireties of the shafts 26 and 36 of the rods 22 and 34 are disposed outside the interior 20.

After placing the object 50 into the interior 20, the cover 14 is closed airtight. Subsequently, the primary rod 22 is screwed into the interior 20 to a desired position and a reading is taken of the exact position of the primary rod 22 as well as of the corresponding pressure reading appearing on the pressure gauge 40.

The cover 14 is then opened and the object 50 is removed from the container 12. With the cover 14 held open, the secondary rod 34 is next screwed into the interior 20 to that degree which will cause the volume occupied by the shaft 36 thereof inside the interior 20 to be approximately equal to the estimated volume of the object 50. Also, prior to the re-closing of the cover 14, the primary rod 22 is returned to its origin. The cover 14 is then closed and the primary rod 22 is then screwed back into the interior 20 to the same exact distance as before to produce an altered pressure condition within the interior 20.

Now, if the volume occupied by the shaft 36 of the secondary rod 34 in the interior 20 is identical to that of the object 50, the reading on the pressure gauge 40 will be identical to the previously recorded pressure reading. In this case, it is determined that the volume of the object 50 is the same as that of the portion of the secondary rod 34 which is present in the interior 20 and that volume can be read directly from the graduations on the secondary rod 34.

Typically, however, the reading on the pressure gauge 40 will indicate that the degree of penetration of the secondary rod 34 is either too high or too low. In this case, the procedure is repeated by opening the cover 14, setting the primary rod 22 back to its origin and adjusting the position of the secondary rod 34 in a direction which will cause the portion of the shaft 36 thereof in the interior 20 to more closely equal the volume of the object 50. The cover 14 is then re-closed and the primary rod 22 is again screwed in to the same exact distance as before and the pressure is noted. At this point, since the volume occupied by the secondary rod 34 in the interior 20 is closer or equal to the volume of the object 50, the pressure reading should correspondingly be closer or equal to the recorded pressure reading.

If it is not, the procedure described above is repeated as often as necessary with constant adjustment made on the secondary rod 34 until a desired accuracy—as indicated by the reading on the pressure gauge 40—is attained.

To speed the measurement process, the pressure relief valve 44 could be operated to restore atmospheric conditions within the interior 20 between successive adjustments of the secondary rod 34 without having to open the cover 14.

FIGS. 4 to 6 illustrate several improvements to the basic structure of the device described above. Quite obviously, the need to alternately screw and unscrew the primary and secondary rods 22 and 34 tends to slow the volume measuring process. However, referring to FIG. 4, each of the primary and secondary rods 22 and 34 could be made to have the structure of the modified rod 60. The modified rod 60 has a smooth outer surface 62 and while it is illustrated as having a circular cross-section it could just as easily have any other cross-section including, for example, a rectangular or any other cross-section. Back and forth adjustment of the modified rod 60 can be carried out very simply and rapidly simply by sliding the modified rod 60 in and out of the interior 20 to a desired degree.

A screw-operated sliding-resistance adjusting wiper 64 is comprised of a screw 65 which is threadable through a block 67 and which has a tip 66 for bearing frictionally on the shaft 68 of the modified rod 60. With the aid of the screw 65 it is possible to control the degree of friction between the stationary screw 65 and the movable rod 60 and thereby the sliding-resistance of the modified rod 60. This feature helps to ensure that the position of the rod 60 will not change in response to elevation of the pressure inside the interior 20 or similar effects.

A ring 70 on the shaft 68 of the modified rod 60 is disposed outside the container 12, is placeable at different locations along the outer surface 62 of the modified rod 60, and is capable of being secured in place by means of a setting screw 72. The ring 70 is usable with the primary rod 22 to provide a means for controlling the maximum degree of penetration of the rod 22. It also allows the rod 60 to be accurately and rapidly inserted into the container 12 to the same degree during the process of repeated adjusting the secondary rod 34.

The end stop 74 on the modified rod 60 facilitates placing of the modified rod 60 rapidly and accurately at its origin position.

FIG. 5 illustrates a plurality of reference objects 80 having standard volumes for use in conjunction with the secondary rod 34. The objects 80 allow measuring of objects which have unknown volumes which are greater than the volume of the shaft 36 of the secondary rod 34. For example, assuming that the total volume of the shaft 36 is only 3 centimeters cubed, the volume of an object 50 which has a volume of about 11 centimeters cubed could still be measured by placing in the container 12 one of the standard objects 80, i.e., the 10 centimeter cubed object 82. The volume of the object 50 is determined as the sum of the standard volume 82 plus the volume of the portion of the shaft 36 of the secondary rod 34 needed for reproducing the originally recorded pressure reading.

In accordance with a still further embodiment of the present invention (FIG. 6), a modified primary rod 90 is biased by means of a spring 92 such that its shaft 94 is normally located outside the interior 20 of the container 12. The knob 96 is operated to push the shaft 94 into the interior 20 to obtain an original recorded pressure reading and all subsequent pressure readings during the required adjusting of the position of the secondary rod 34. The modified primary rod 90 may also be fitted with the ring 70 of FIG. 4, such ring 70 being disposed between the spring 90 and the knob 96 for the purpose of controlling the degree to which the shaft 94 should penetrate the interior 20. This feature is desirable to have since there may exist an optimal pressure setting which responds most sensitively to variations in the volume of an object 50 placed in the interior 20. Thus, one can set the ring 70 such as to carry out the volume measuring process at this more sensitive pressure setting.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for measuring the volume of an object, the device comprising:
   a container for holding an object and means for closing the container airtight;
   first means for being selectively projected into the container to generate an altered pressure therein;
   pressure measuring means coupled to the container for measuring the pressure in the container and for obtaining therewith an original pressure reading associated with the object;
   second means controllably projectable into the container to duplicate the original pressure reading; and
   third means associated with the second means and effective for indicating the volume occupied by the object in the container.

2. The device of claim 1, wherein the first means comprises a primary rod with a shaft which is controllably movable into and out of the container 3. The device of claim 2, further comprising first indicating means on the primary rod for indicating the degree of penetration of the primary rod into the container.

4. The device of claim 3, wherein the indicating means comprises numerical graduations on the primary rod.

5. The device of claim 3, wherein the shaft of the primary rod is threaded.

6. The device of claim 2, wherein the shaft of the primary rod has a smooth faced surface and the shaft is slidable into and out of the container 7. The device of claim 6, further comprising means for adjusting a sliding friction associated with the primary rod.

8. The device of claim 6, further comprising a movable stop means on the primary rod for setting a maximum extent to which the shaft of the primary rod can be inserted into the container.

9. The device of claim 2, further comprising spring means on the primary rod for biasing the rod so that normally, substantially the entirety of the shaft of the primary rod is disposed outside the container.

10. The device of claim 3, wherein the container includes an openable cover and further comprising pressure relief means operable for establishing atmospheric pressure conditions in the container without opening the cover of the container.

11. The device of claim 10, wherein the pressure relief means comprises a human actuatable pressure relief valve.

12. The device of claim 3, further including a plurality of reference objects having different known volumes for being placed in the container.

13. The device of claim 1, wherein the second means comprises a secondary rod with a shaft which is controllably movable to different degrees into and out of the container 14. The device of claim 13, the third means comprising indicating means on the secondary rod for indicating the volume occupied by the secondary rod in the container.

15. The device of claim 14, wherein the indicating means comprises numerical graduations on the secondary rod.

16. The device of claim 13, wherein the shaft of the secondary rod is threaded

17. The device of claim 13, wherein the secondary rod has a smooth faced surface and the shaft of the secondary rod is slidable into and out of the container.

18. A device for measuring the volume of an object, the device comprising:
 a container for holding an object being measured, the container including means for closing the same airtight;
 at least one primary rod and at least one secondary rod, each of which can be projected into an interior defined by the container to a desired degree; and
 a pressure gauge attached to the container for measuring the pressure inside the container, the volume of the object being measured being determined on the basis of altering the pressure within the container and the degree of penetration of the secondary rod into the interior.

19. The device of claim 18, wherein at least one primary rod comprises screw-like threads and graduations for indicating the degree of penetration of the primary rod into the container.

20. The device of claim 19, wherein the at least one secondary rod is provided with screw-like threads and graduations for indicating the volume of that portion of the secondary rod which is disposed within the container.

* * * * *